US012705032B2

(12) United States Patent
Wimmer et al.

(10) Patent No.: US 12,705,032 B2
(45) Date of Patent: Aug. 11, 2026

(54) PARTIAL EVALUATION OF SINGLE EXECUTION METHODS

(71) Applicant: Oracle International Corporation, Redwood Shores, CA (US)

(72) Inventors: Christian Wimmer, Belmont, CA (US); Liviu Codrut Stancu, Zurich (CH); Vojin Jovanovic, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 239 days.

(21) Appl. No.: 18/204,320

(22) Filed: May 31, 2023

(65) Prior Publication Data

US 2024/0403009 A1 Dec. 5, 2024

(51) Int. Cl.
*G06F 8/41* (2018.01)
*G06F 9/445* (2018.01)

(52) U.S. Cl.
CPC ................ *G06F 8/41* (2013.01); *G06F 9/445* (2013.01)

(58) Field of Classification Search
None
See application file for complete search history.

(56) References Cited

U.S. PATENT DOCUMENTS 6,535,903 B2 * 3/2003 Yates ...................... G06F 9/455 712/E9.083
11,954,510 B2 * 4/2024 Nigro .................. G06F 9/45558
2008/0034358 A1 * 2/2008 Quan ...................... G06F 8/443 717/151
2011/0246972 A1 * 10/2011 Andrade ............. G06F 9/45516 717/137
2012/0185847 A1 * 7/2012 Ohrstrom ............ G06F 9/45508 718/1
2017/0083298 A1 * 3/2017 Kotas ........................ G06F 8/52
2017/0115994 A1 * 4/2017 Goodman ........... G06F 12/1408
2021/0064352 A1 * 3/2021 Drepper ................ G06F 8/4435

FOREIGN PATENT DOCUMENTS

RU 2802860 C1 * 9/2023 ........... G06F 21/552

OTHER PUBLICATIONS

Wimmer et al., "Initialize Once, Start Fast: Application Initialization at Build Time," ACM, 2019. (Year: 2019).*
D'Elia et al., "Flexible On-Stack Replacement in LLVM," ACM, 2016. (Year: 2016).*
Danilewski et al., "Specialization through Dynamic Staging," ACM, 2014. (Year: 2014).*
Sipek et al., "Enhancing Performance of Cloud-based Software Applications with GraalVM and Quarkus," IEEE, 2020. (Year: 2020).*

(Continued)

*Primary Examiner* — Ryan D. Coyer
(74) *Attorney, Agent, or Firm* — Lathrop GPM LLP

(57) ABSTRACT

Systems and methods implement partial evaluation of single execution methods. A native image is built from a build image compiled from source code. At image build time, a single execution method of the build image is executed to update an image heap of the native image. The single execution method is executed with a single execution for a native instance. The image heap is stored to the native image built from the build image.

20 Claims, 5 Drawing Sheets

(56) References Cited

OTHER PUBLICATIONS

Zhao et al., "Flock: Towards Multitasking Virtual Machines for Function-as-a-Service," IEEE, 2023. (Year: 2023).*
GraalVM., "GraalVM Open Source"; Community Edition, 2018 (3 pages). https://www.graalvm.org/community/opensource/.
Wimmer, C. et al.; "Initialize Once, Start Fast: Application Initialization at Build Time"; Proceedings ACM Program. Lang., vol. 3, OOPSLA, Article 184, Oct. 2019 (29 pages). https://dl.acm.org/doi/10.1145/3360610.

* cited by examiner

```
enum Value {
     VALUE_1,
     VALUE_2;

     static final Map<String, Value> lookup;

     static {
          lookup = new HashMap<>();
          for (Value v : values()) {
               lookup.put(v.name(), v);
          }
     }
}
```

```
static void <clinit>() {
     VALUE_1 = new Value("VALUE_1", 0);
     VALUE_2 = new Value("VALUE_2", 1);

     lookup = new HashMap<>();
     for (Value v : values()) {
          lookup.put(v.name(), v);
     }
}
```

520
NETWORK
522
NODE X
524
NODE Y
526
CLIENT DEVICE

PARTIAL EVALUATION OF SINGLE EXECUTION METHODS

BACKGROUND

Software is written as source code that is compiled to a build image that is instantiated as an instance. In certain environments, the source code may include methods that are executed once per instance and that may be referred to as single execution methods. An example of a single execution method includes an initializer for a class, referred to as a class initializer. Single execution methods require processing time and memory to execute for each instantiation of an instance. A challenge is to instantiate instances without expending computational resources on the single execution methods.

SUMMARY

In general, in one or more aspects, the disclosure relates to a method implementing partial evaluation of single execution methods. A native image is built from a build image compiled from source code. At image build time, a single execution method of the build image is executed to update an image heap of the native image. The single execution method is executed with a single execution for a native instance. The image heap is stored to the native image built from the build image.

In general, in one or more aspects, the disclosure relates to a system implementing partial evaluation of single execution methods. The system includes at least one processor, at least one memory coupled to the processor, and an application executing on the processor. A native image is built from a build image compiled from source code. At image build time, a single execution method of the build image is executed to update an image heap of the native image. The single execution method is executed with a single execution for a native instance. The image heap is stored to the native image built from the build image.

In general, in one or more aspects, the disclosure relates to a system implementing partial evaluation of single execution methods. The system includes at least one processor, at least one memory coupled to the processor, and an application executing on the processor. A native image is built from a build image compiled from source code. At image build time, a single execution method of the build image is executed to update an image heap of the native image. The single execution method is executed with a single execution for a native instance. The image heap is stored to the native image built from the build image.

Other aspects of the invention will be apparent from the following description and the appended claims.

BRIEF DESCRIPTION OF DRAWINGS

FIG. 3, FIG. 4A, and FIG. 4B show examples in accordance with disclosed embodiments.

DETAILED DESCRIPTION

In general, embodiments of the disclosure implement partial evaluation for single execution methods to instantiate instances without using computational resources on single execution methods at runtime. By executing the single execution methods before runtime, the computational time and resources normally used for the execution of the single execution methods are not used during runtime.

For example, source code compiled to a build image may include a single execution method, e.g., a class initializer. Each time the build image is instantiated at runtime, the single execution method is executed. For applications that are instantiated to hundreds or thousands (or more) instances, the computational time and resources required to execute the single execution method for each instance may be significant. In contrast, using partial evaluation to execute the single execution method once and prior to runtime reduces the amount of computational time and resources to bring up an instance of a build image.

Figure 1:
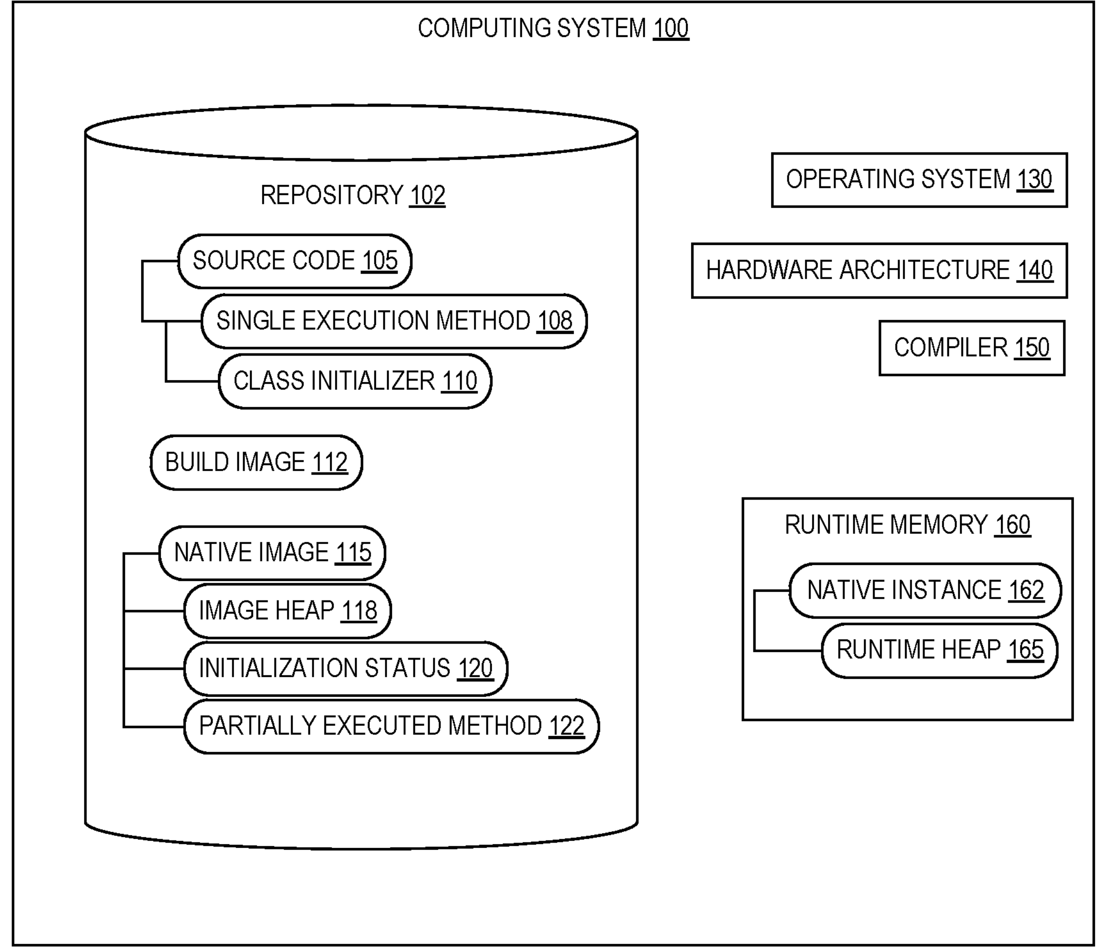
FIG. 1 shows a diagram of systems in accordance with disclosed embodiments.

Turning to FIG. 1, the computing system (100) implements partial evaluation of single execution methods. The computing system (100) is a computing system as further described in FIGS. 5A and 5B. Embodiments of the computing system (100) may include desktop computers, mobile devices, laptop computers, tablet computers, server computers, virtual computers, etc. In one embodiment, the computing system (100) is hosted in a cloud computing environment. In one embodiment, the computing system (100) executes the native instance (162), which is generated from the source code (105). The computing system (100) includes the repository (102), the operating system (130), the hardware architecture (140), the compiler (150), and the runtime memory (160).

The repository (102) is a data storage system that stores information used by the computing system (100). In one embodiment, the repository (102) is implemented as non-volatile memory of the computing system (100). The data in the repository (102) includes the source code (105), build image (112), and native image (115).

The source code (105) is a collection of files that include listings of commands that define programs that may be executed by the computing system (100). Different files of the source code (105) may be written using different languages. The source code (105) may be compiled, assembled, interpreted, etc., to executable files that operate and control the computing system (100). The source code (105) includes the single execution method (108).

The single execution method (108) is a method of the source code (105) that is executed one time for a given instance of the source code (105). For example, the native instance (162) (which is an instance of the source code (105) for the operating system (130) and the hardware architecture (140)) may execute the single execution method (108) one time without a subsequent execution of the single execution method (108). In one embodiment, the single execution method (108) is written as the class initializer (110), i.e., a the single execution method (108) may be an initializer of a class.

The class initializer (110) is a portion of the source code (105) that initializes a class. Certain programming languages may have that class initializers are to be executed once without subsequent execution. For example, the class initializer (110) may include a class initialization block that is a set of statements preceded by the static keyword that is introduced into the body of a class. The statements of the class initialization block form the single execution method (108) that is executed when the class loads and may provide initial values of objects in the class.

By way of an example of a single execution method, object-oriented languages may allow each class to have a class initializer, which is a single execution method that is executed exactly once before the class is used the first time. Many class initializers are simple and do not depend on external state. To reduce application startup time, it is beneficial to execute such class initializers at build time. Partial evaluation may be used to provide the control over side effects and outcomes of class initialization.

Class initialization may be implicit by providing a value of a "static final" field where the field is designed, or even just by declaring an "enum". As a result, many class initializer may not depend on external state, and do not have side effects on other classes. Still, specifications of object-oriented languages may have that a class initializer is executed as late as possible before the first usage of the class. Virtual machines (VMs) may execute the class initializer at runtime during program execution. Certain specifications may also have that a class initializer is executed exactly once, which requires expensive locking at runtime before invoking the class initializer.

A system may execute code that depends on a state and modifies a state and may, in practice, be used to execute code that does not depend on external state and does not modify any external state. No difference may be observed when code that does not depend on external state and does not modify any external state is executed earlier than the first usage of a class. Systems that execute initialization code at build time may execute many class initializers earlier than build time. However, detection of whether a class initializer or other single execution method is safe for early execution may be nontrivial.

Partial evaluation simulates the execution of a method. From a compiler developer's point of view, partial evaluation may be seen as aggressive method inlining and constant folding. Partial evaluation may be used in a wide variety of domains.

Since the specification of certain languages may have that a class initializer is executed exactly once, instructions of the class initializer may be partially evaluated that are not otherwise safe to be partially evaluated. Such instructions may include allocation instructions. When partially evaluating a class initializer, allocation instructions may be evaluated to constants, and memory stores into those newly allocated objects may modify those constants and then be removed. Looping structures within the code may also be challenging to evaluate because a loop body may be executed multiple times, even when the loop is only entered exactly once. Loop unrolling may address issues with loops.

The build image (112) is a set of files generated from the source code (105). In one embodiment, the build image (112) includes multiple files for executing an application. The files within the build image (112) may include multiple software components, which may include files from the source code (105), binary files, bytecode files, library files, runtime dependency files, etc. Portions of the build image (112) may be agnostic to the operating system (130) and the hardware architecture (140).

The native image (115) is a partially evaluated version of the build image (112) that has been partially executed and is instantiated as the native instance (162). In one embodiment, the native image (115) is partially executed by a different computing system to reduce the time and computer resources to instantiate the native instance (162) from the native image (115). In one embodiment, the native image (115) includes the image heap (118), the initialization status (120), and the partially executed method (122).

The image heap (118) is a memory space generated when the build image (112) is partially evaluated. The image heap (118) may store the objects, components, data, etc., that are loaded and stored during the execution of the partial evaluation. In one embodiment, the image heap (118) may be generated by heap snapshotting during the execution execution of the class initializer (110).

In one embodiment, an input to the system may be the bytecode, compiled from source code written in programming languages that may be compiled to bytecode, including Java®, Scala, Kotlin, etc. The application, libraries thereof, developer kits, and virtual machine components may each be processed in a similar fashion. The result is a native executable for a specific operating system and architecture. The executable for a specific operating system and architecture may be referred to as a native image.

First, a points-to analysis and heap snapshotting are executed iteratively until a fixed point is reached to generate a list of reachable classes, methods, and fields, as well as an object graph of reachable objects. Then, the reachable methods are compiled to machine code, and an object graph is written out as the image heap in the same layout that is used at runtime for the heap. The machine code is stored in the text section of the native image, and the image heap is stored in the data section. The entire process that produces a native image is referred to as "image build time" to distinguish from the compilation of source code to bytecode (often called "compile time" or "build time").

Heap snapshotting builds an object graph, i.e., the transitive closure of reachable objects starting with root pointers such as static fields. This object graph is written into the native image as the image heap, i.e., the initial heap when the native image is started. The root pointers of the image heap are static object fields that are marked by the points-to analysis as read. These root values are first added to a worklist, and then the worklist is processed until it is empty. Every object is added once to the worklist and processed to generate a set with reachable objects.

The initialization status (120) is an identifier for the native image (115). The initialization status (120) identifies whether the single execution method (108) has been executed, has been partially executed, and has not been executed. In one embodiment, the initialization status (120) may use the labels "executed", "partially executed", and "not executed" to identify the execution status of the single execution method (108) in the native image (115).

The partially executed method (122) is the instance of the single execution method (108) for the native image (115). As indicated by the initialization status (120), the status of the partially executed method (122) may be "executed", "partially executed", and "not executed". In one embodiment, "executed" means that the single execution method (108) has been fully executed and will not run as part of the native instance (162); "partially executed" means that the single execution method (108) has been partially executed for the native image (115) and will be further executed by the native instance (162); and "not executed" means that the single execution method (108) has not been executed for the native image (115) and will be executed by the native instance (162).

The operating system (130) is the software of the computing system (100) that performs functions, including scheduling tasks, executing applications, controlling peripherals, etc. The build image (112) may be agnostic to the operating system (130) while the native image (115) is targeted to the operating system (130).

The hardware architecture (140) is the hardware of the computing system (100) that includes the processors, memory, peripherals, etc. The build image (112) may be agnostic to the hardware architecture (140) while the native image (115) is targeted to the hardware architecture (140).

The compiler (150) is program that translates code written in a programming language into machine code, bytecode or another programming language. For example, the compiler (150) may be a bytecode compiler that is used to generate the build image (112) from the source code (105).

The runtime memory (160) is memory of the computing system (100) that is used during the runtime of the native instance (162). The runtime memory (160) may include volatile memory of the computing system (100).

The native instance (162) is an instance of the native image (115) that is actively running on the computing system (100). The native instance (162) is loaded to the runtime memory (160) and executes on the processors of the computing system (100).

The runtime heap (165) is the heap of the native instance (162) that is active during the runtime of the native instance (162). When initialized, the image heap (118) is loaded to the runtime memory (160) to form the runtime heap (165).

Figure 2A:
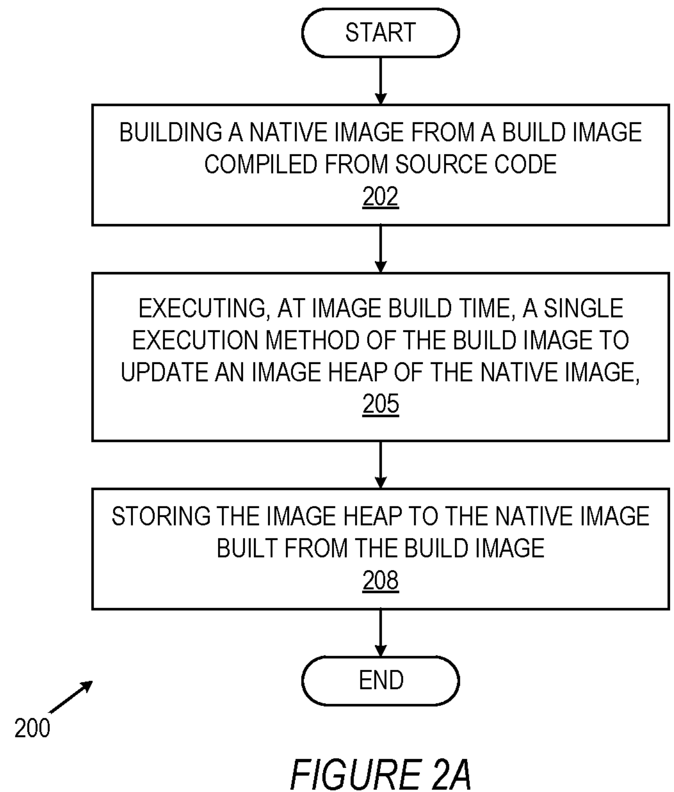
FIG. 2A and FIG. 2B show flowcharts in accordance with disclosed embodiments.

Turning to FIG. 2A, the process (200) generates a native image using partial evaluation of single execution methods. The process (200) may be performed by a computing system, such as those described with FIG. 1, FIG. 5A, FIG. 5B, etc.

At Step 202, a native image is built from a build image compiled from source code. In one embodiment, the build image is received from a compiler that compiles the source code to form the build image. Compilation translates from one language or code to another. The languages and codes may include programming languages, bytecodes, binary codes, machine codes, etc. For example, a compiler may translate from a programming language to a set of bytecodes, which may then be executed by a virtual machine.

In one embodiment, the source code includes a class definition. For example, the source code may be written in an object-oriented programming language (e.g., Java®, which is a registered trademark of Oracle America, Inc. CORPORATION DELAWARE 500 Oracle Parkway Redwood Shores CALIFORNIA 94065) in which a class definition is the portion of the source code that defines a class from which objects may be instantiated at runtime.

In one embodiment, the build image is processed to generate the native image, which includes an image heap. To process the build image and generate the native image, an operating system and hardware architecture are identified as the targeted operating system and targeted hardware architecture for the native image. In one embodiment, the build image may be partially evaluated and executed on a computing system that uses the targeted operating system and hardware architecture to form the native image. In one embodiment, the build image may be partially evaluated to form the native image without execution on a targeted computing system. A heap is generated for the partial evaluation of the build image to identify the location of data and objects within the memory space of the heap. After the partial evaluation is complete, the heap generated for use during the partial evaluation is stored as the image heap. The image heap is included as part of the native image and is used as the initial heap when the native image is instantiated on a targeted computing system.

At Step 205, a single execution method of the build image is executed, at image build time, to update an image heap of the native image. For example, the single execution method may store constants or initialize objects to a memory space that forms the image heap.

In one embodiment, the single execution method is executed with a single execution for a native instance. Each time a native instance runs on a computing system, the single execution method is (or has been) executed one time without a subsequent execution. The execution of the single execution method may be performed during one or more of image build time and runtime, which occur after build time.

In one embodiment, the single execution method is part of a class of a set of classes. Initialization of the class at image build time may be conditioned upon initialization of a different class at image build time of the set of classes. For example, the single execution method may be a method defined for a first class and one of the instructions in the single execution method may be to instantiate a second class.

In one embodiment, the single execution method is a class initializer of a class. As a class initializer, the single execution method may, during partial evaluation before runtime, store data to memory and initialize other objects that are used by the class during runtime.

In one embodiment, after executing the single execution method, a class that includes the single execution method is identified as partially initialized at image build time after execution of the single execution method encounters an unresolvable dependency. Types of unresolvable dependencies include a loop with undefined iterations, a runtime value, a conditional execution path in the code of the single execution method, etc.

In one embodiment, after executing the single execution method, a class that includes the single execution method may be identified as initialized at image build time after allocating one or more objects to the image heap. The class may be identified as initialized upon completed of the execution of the single execution method, which may be the class initializer for the class.

In one embodiment, a remaining portion of the single execution method is executed at runtime using the image heap. For example, at runtime, the image heap is loaded as the heap for the native instance and the portion of the single execution method that was not executed may complete execution. Since this execution is during runtime, the heap may be manipulated by other methods, objects, programs, classes, etc., such that data and objects stored to the heap by the single execution method may be in a different location as compared to where the data and objects would have been if execution had completed during image build time.

In one embodiment, a loop may be unrolled during partial evaluation (which may be before runtime) as part of executing the single execution method. In one embodiment, loop unrolling includes replicating the body of the loop for each time the body of the loop would be executed. Instead of looping back to execute the same loop body, the replicated bodies of the loop are executed without looping back. Loop unrolling may be performed when the number of iterations of the loop is defined.

In one embodiment, The native image corresponds to an operating system and a hardware architecture. Different native images may be built from the same build image. The different native images may target different operating systems or hardware architectures.

At Step 208, the image heap is stored to the native image built from the build image. During image build time, the native image is generated from the build image. To generate the native image, the build image may be instantiated to a target operating system and hardware architecture and partially executed. In order to instantiate the build image, heap is generated that defines the memory for the instance of the building. When partial evaluation is complete, the changes made to the heap are saved as the image heap and the changes to the build image are saved as the native image. At runtime, the system may instantiate a native instance from the native image and the image heap instead of from the build image and an empty heap. Instantiating the native instance from the native image and the image heap saves the time and computing resources used to generate the native image from being expended each time a native instance is instantiated.

Figure 2B:
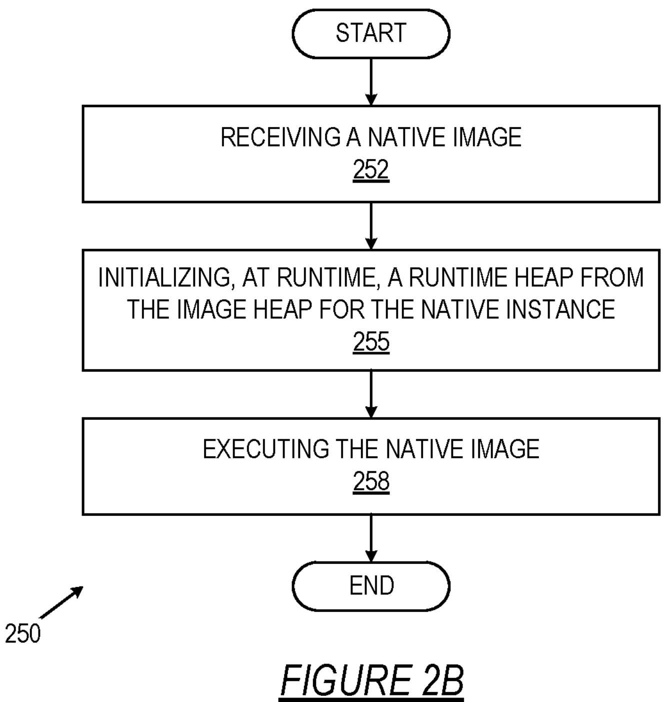

Turning to FIG. 2B, the process (250) uses partially evaluated single execution methods. The process (250) may be performed by a computing system, such as those described with FIG. 1, FIG. 5A, FIG. 5B, etc.

At Step 252, a native image is received. In one embodiment, the native image is received from a server that provisioned the computing system to instantiate and execute the native image.

At Step 255, a runtime heap is initialized, at runtime, from an image heap for the native image. The native image includes the image heap. The image heap is the heap for the native instance that was saved at the end of image build time after partial evaluation was completed.

At Step 258, the native image is executed. In one embodiment, execution of the native image begins at runtime where execution was halted at the end of image build time.

Partial evaluation may be seen as aggressive method inlining and constant folding, but may be more efficient than repeatedly applying method inlining and constant folding. Instead of inlining whole methods and then simplifying, partial evaluation walks through each instruction of a method, simplifies (i.e., evaluates) the instruction if possible, and then appends either the result of the evaluation or (if evaluation is not possible) the original instruction to the partial evaluation result. Several types of evaluations may be performed by a partial evaluation.

Arithmetic expressions may be evaluated. The arithmetic expression that are evaluated include expressions where the inputs are constant and which are evaluated to the constant result.

Field loads where the accessed object is a constant may be evaluated to the current value of the field. Field loads may be allowed for "final" fields of certain languages and may also be done for non-final fields when the current value of the field has not changed since the last field store that was evaluated.

Control flow split instructions may be partially evaluated. For example, control flow split instructions (like "if" instructions) with a constant condition may be removed and simplified to the successor that represents the constant condition.

Direct methods calls may be partially evaluated. For direct methods calls, i.e., calls that have a single known callee, partial evaluation may continue in that callee, with formal method parameters of the callee replaced with the actual method parameters at the call site, which may be similar to method inlining.

Indirect method calls may be partially evaluated. For example, indirect method calls with a constant receiver object may be de-virtualized to a direct method call. A constant receiver has a single type, and a single type may have one implementation of the method. For example, an interface method call to "Map.get( )" with the receiver being a constant of type "HashMap" may be de-virtualized to the direct method call of "HashMap.get( )".

Figure 3:
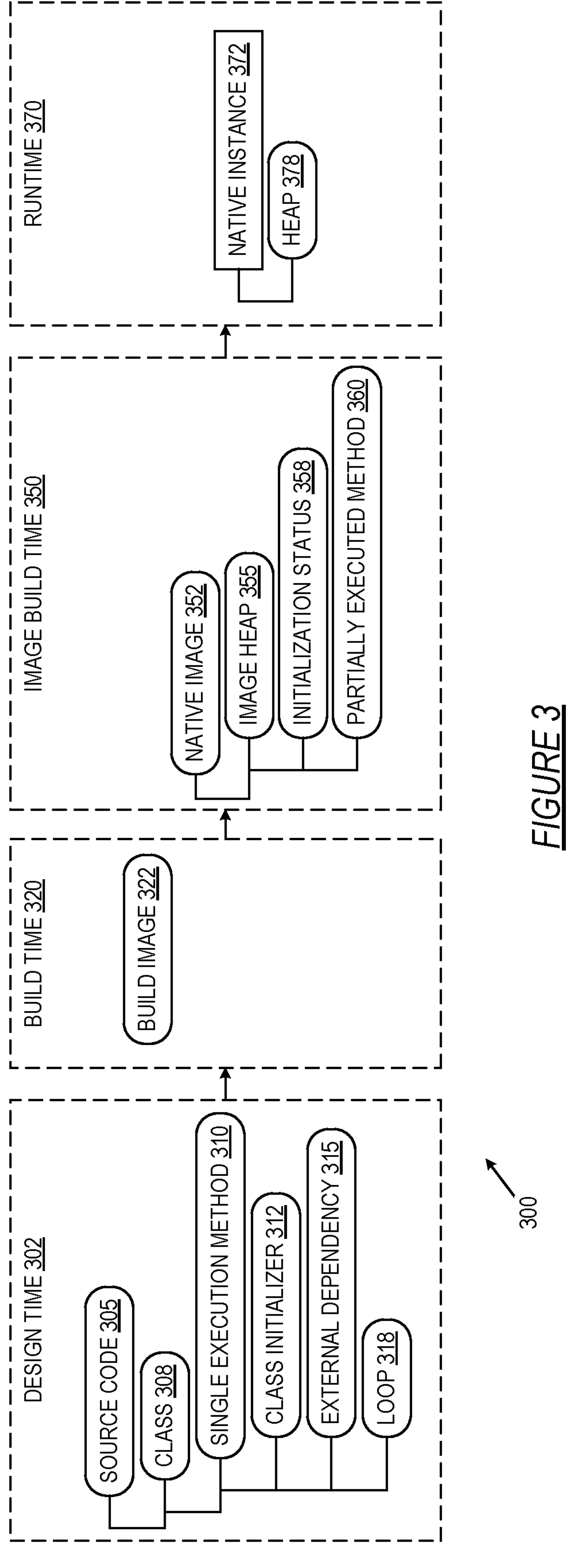

Turning to FIG. 3, the flow (300) represents a flow of data through a system for the development and execution of an application utilizing partial evaluation of single execution methods. A system executing the flow (300) may include one or multiple computing systems as described in FIG. 5A and FIG. 5B.

The design time (302) is a duration of time during which the source code (305) is designed and developed. The design time (302) may occur before the build time (320). During the design time (302), the source code (305) may be written and stored to a computing system. For example, a developer may use a desktop computer to write source code (305) that is saved to a repository hosted by a remote server.

The source code (305) are the instructions for the programs of an application. The source code (305) may be stored in multiple files on a computing system. Different files may use different languages. One of the files of the source code (305) may utilize an object-oriented programming language and include the class (308).

The class (308) is a definition of the methods and variables in a programming object that may execute on a computing system. The class (308) includes the single execution method (310).

The single execution method (310) is a method of the class (308). The single execution method (310) includes instructions for manipulating data within a computing system. The single execution method (310) may be written as the class initializer (312), may include the external dependency (315), and may include the loop (318).

The class initializer (312) is an initializer for the class (308). The class initializer (312) initializes data to be used by objects instantiated during runtime from the class (308).

The external dependency (315) is a dependency within the single execution method (310) to data or instructions that are outside of the single execution method (310). For example, the external dependency (315) may be a call to the method of a different class or may be a reference to the data of a different class. Some external dependencies may be resolved during partial evaluation while other external dependencies may not be resolved during partially evaluation. For example, references to data of other classes may be resolvable when the data is constant data that is added to but not removed from the heap.

The loop (318) is a set of instructions within the single execution method (310) in which a body of the loop (318) may be executed multiple times based on a looping condition. Some loops may be resolved during partial evaluation while other loops may not be resolved during partial evaluation. For example, with a defined finite number of durations may be resolvable and be unrolled during partial evaluation. Loops in which the number of iterations are not defined may not be resolvable and may not be executed during partial evaluation.

The build time (320) is a duration of time during which the build image (322) is built from the source code (305). The build time (320) may occur after the design time (302) and before the image build time (350).

The build image (322) may include multiple files that are generated from the files of the source code (305). The files of the build image (322) may be generated by compiling, building, linking, assembling, etc., files from the source code (305). The build image (322) may include multiple executable files that may be executed on a computing system.

The image build time (350) is a duration of time during which the native image (352) is generated from the build image (322). The image build time (350) may occur after the build time (320) and before the runtime (370).

The native image (352) may be a copy of the build image (322) that has been partially evaluated and executed. In one embodiment, the build image (322) is instantiated on a computing system with the target operating system and hardware architecture identified for the native image (352). The instantiation of the build image (322) may then be partially evaluated and executed. After completion of the partial evaluation, execution of the build image instantiation is halted to save the current state of the instantiation of the build image (322) as the native image (352). The native image (352) includes the image heap (355), initialization status (358), and the partially executed method (360).

The image heap (355) is the heap that corresponds to the native image (352). A heap is initialized when the build image (322) is instantiated. The heap for the instantiation of the build image (322) is updated during the partial evaluation and execution of the instantiation of the build image (322). The heap, at the time when the execution of the instantiation of the build image (322) is halted, is stored as the image heap (355).

The initialization status (358) is a status of an initialization related to the native image (352). In one embodiment, each of the methods that are partially evaluated and executed during the image build time (350) may have an initialization status identification. In one embodiment, initialization status (358) is the status of the initialization of the class (308) by the single execution method (310) operating as the class initializer (312) for the class (308). In one embodiment, the initialization status (358) indicates whether the class initializer (312) for the class (308) has been executed, partially executed, or not executed by the time the execution of the instantiation of the build image (322) is halted.

The partially executed method (360) is the instantiation of the single execution method (310) within the native image (352). In one embodiment, the partially executed method (360) may include instructions in the form of bytecode that will compiled from the source code (305).

The runtime (370) is a duration of time during which the native instance (372) is executed, i.e., running. The runtime (370) may occur after the image build time (350).

The native instance (372) is an instantiation of the native image (352) on a computing system that has the same operating system and hardware architecture as the operating system and hardware architecture identified for the native image (352). The native instance (372) begins execution where execution was halted at the end of the image build time (350).

The heap (378) is a memory space used by the native instance (372). The heap (378) is initialized as a copy of the image heap (355), which was saved when execution halted at the end of the image build time (350).

FIG. 4A and FIG. 4B show examples of code (written in Java®) that may make use of partial evaluation of single execution methods, such as for a class initializer in an object-oriented programming language. FIG. 4A, shows the code (400) is for a class (named "Value") that enumerates multiple values. FIG. 4B shows the code (450) for a class initializer of the class of the code (400) of FIG. 4A.

The following is an example of at least some embodiments for explanatory purposes only and not intended to limit the scope of the claims.

Since the specification of the programming language has that, a class initializer is executed once, it is possible to partially evaluate statements that may not normally be safe to be evaluated by partial evaluation. Additionally, the code (400) and (450) include allocation instructions. When partially evaluating a class initializer, allocation instructions may be evaluated to constants referencing newly created image heap objects, and memory stores into those newly allocated objects may be evaluated by modifying the image heap objects. Additional processing may be had for loops in a class initializer, because a loop body may be executed multiple times even when the class initializer containing the loop is only entered once. For loops, loop unrolling may be used.

Turning to FIG. 4A, the code (400) includes an "enum" which also has a lookup table that allows fast access of enum members by name. In addition to the "static final" fields "VALUE_1" and "VALUE_2" that are implicitly defined by the enum, the class has a field "lookup" that provides a byname lookup of the enum elements that lookup table is built in an explicit class initializer. The method "values( )" is also implicitly defined by the enum and returns a newly allocated array that contains the "VALUE_1" and "VALUE_2". The example contains a loop in the class initalizer itself. The invoked method "HashMap.put" also has a loop, contains virtual invocations of "Object.hashCode( )" and "Object.equals( )", and performs multiple other complex operations.

Turning to FIG. 4B, the class initializer of "Value" is shown in the code (450). Execution of the class initializer produces the following object graph: The two "Value" objects are reachable from their respective "static final" fields. In addition, there is a "HashMap", which via internal helper objects (a "Node [ ]" array and two "Node" objects) references the same two "Value" objects and their name strings. Partial evaluation of the class initializer is able to produce the objects from the object graph, while at the same time proving that the class initializer does not depend on any external state and has no side effects on other classes even though collection data structures are used, for which a static analysis usually may not guarantee that one particular usage is side-effect free.

The steps described below may occur during partial evaluation of the code (400) of FIG. 4A and the code (450) of FIG. 4B.

Step 1, the allocation of the first "Value" object produces an image heap object where each of the fields have the default value.

Step 2, the invocation of the constructor is already a direct call. Partial evaluation goes into the constructor.

Step 3, for the two field stores in the constructor, the receiver object is the just evaluated "Value" object, therefore partially evaluating the stores is allowed. The assigned values are also constants (a string and a primitive integer).

Step 4, partial evaluation of the constructor is done and no instructions other than constants were produced.

Step 5, the store of the static final field "VALUE_1" remains as a field store instruction, with the stored value being the image heap constant.

Step 6, the same steps are repeated for the field "VALUE_2".

Step 7, the same steps are repeated for the field "lookup", with the only difference being that a different type is allocated, and a different constructor is partially evaluated.

Step 8, by now, three store instructions of static final fields and several image heap constants, each of the other instructions were evaluated.

Step 9, now processing of the loop starts. Each of the loops are fully unrolled.

Step 10, the loop is processing the array returned by "values( )". The method allocates a new array of length 2 and stores "VALUE_1" and "VALUE_2" in its two elements. The array allocation again leads to an image heap object, and the two array stores are evaluated by modifying the image heap object for the array.

Step 11, the loop iterates from 0 to the array length. Since the array is an image heap object, the instruction reading its length is evaluated to the constant 2. Loop unrolling therefore processes the loop body twice, thereby eliminating the loop.

Step 12, each loop iteration invokes the "put" method. Initially, the invocation is an interface call because the declared type of the field "lookup" has the interface type "Map". But the load of the field "lookup" is evaluated because there has been no instruction emitted since the load was stored, i.e., the field load of "lookup" is evaluated to the image heap constant of the HashMap. Since the receiver of the "put" invocation is a constant with a known type, then is known that "HashMap.put" is the invoked method. Partial evaluation goes into the "put" method.

Step 13, the implementation of "HashMap.put" may be complex. The implementation involves many conditions, another loop, and many methods virtual invocations of "Object.hashCode" and "Object.equals". But because the receiver of "HashMap.put" as well as each of the other arguments to the receiver are constants, each of the conditions may be evaluated, the loop may be fully unrolled again, and each of the virtual method invocations may be de-virtualized. In particular, the invocations of "hashCode" and "equals" are resolved to "String.hashCode" and "String.equals" because the keys of the HashMap are constant strings.

Step 14, partial evaluation of "String.hashCode" and "String.equals" is again successful and produces only constants, because the strings have a constant length the loops that iterate over the strings may be unrolled.

Step 15, in summary, the partial evaluation of the two invocations of "HashMap.put" do not produce any instructions, but only modify the image heap objects that were allocated earlier by the class initializer.

Step 16, when the partial evaluator reaches the end of the class initializer, there are still only the three store instructions of the static final fields and several image heap constants, each of the other instructions were evaluated. The partial evaluation therefore proves that the class initializer does not depend on any external state and is free of any side effects on other classes.

Step 17, the class is marked as "initialized at image build time", i.e., its initialized flag is set to "true". The values stored by the three store instructions form the values of the static final fields.

Identifying Success of Partial Evaluation

Partial evaluation of a class initializer is successful when after partial evaluation there are two kinds of instructions remaining: stores of static fields of that class, and constants. With stores of static fields of that class and constants, there are no control flow splits, no control flow merges, and no method invocations, leaving a sequential list of field store and constant instructions. In such a case, the class may start out as "initialized" at runtime. When initialized, the initialized flag of the class is set to "true" at image build time; class initialization checks for that class are removed in usages of the class; and constants assigned in the static field store instructions are collected, which form the initial values of the static fields in the image heap.

Handling of Object and Array Allocations

An object allocation instruction is partially evaluated to a constant instruction. The constant instruction references a new image heap object where each of the fields have the default value (0, null, and false in Java®). For an array allocation instruction, partial evaluation is only possible when the array length is a constant.

Each of the image heap objects that are produced by partial evaluation of allocations are added to a set of "active objects": when a field store or array store to such an object is seen by the partial evaluator and the stored value is a constant too, then the store instruction is removed, and the respective field/array element of the image heap object is updated to the new value. That covers each of the cases where after object allocation a constructor is invoked, and the constructor sets various instance fields of the newly allocated object.

Eliminating stores is only allowed as long as the store is unconditionally executed after the allocation, i.e., if the store is part of straight-line control flow after the allocation. At every control flow split (for example an "if" statement that was not evaluated because the condition is not a constant), the set of "active objects" is cleared. Subsequent stores after such a clear are not eliminated, i.e., the class will not be seen as "initialized at image build time".

Handling of Invoked Methods

A heuristic is used to decide to partially evaluate in invoked methods. The heuristic may be "stop partial evaluation at a certain call depth and/or maximum number of instructions" which is often used to limit method inlining. Another heuristic may be used that both efficiently limits the number of partially evaluated instructions and maximizes the benefits of partial evaluation: stop partial evaluation of an invoked method when the first control flow split is encountered in the invoked method. As mentioned previously, control flow splits clear the set of "active objects" where memory stores may be partially evaluated. A control flow split may effectively eliminate most benefits and continuing partial evaluation after a control flow split may not be performed. Since a method cannot be "half partially evaluated" (which may create issues with invoking the remaining half of the class initializer at runtime), the partial evaluation of the whole invoked method is rolled back on the first control flow split, i.e., each of the previous optimizations of allocations and fields stores in the invoked method are discarded, and instead a regular invocation in the method remains in the class initializer. The class will not be seen as "initialized at build time".

Handling of Loops in Methods Invoked by the Class Initializer

Each of the loops in inlined methods are always fully unrolled. Not unrolling would always lead to a control flow split and trigger a rollback of the partial evaluation. In practice, many loops encountered during partial evaluation are in fact fully unrollable: even if the loops are unbounded in general, like when "iterating over an array", the loops have a small and known number of iterations when the involved loop variables and bounds are constants too. For example, the iteration over an array may be unrolled when the array is an image heap object produced by prior partial evaluation of an array allocation. A loop is not fully unrollable when the loop exit condition is not a constant. The heuristic to abort the partial evaluation of invoked methods on the first control split effectively also detects non-unrollable loops and no additional check is performed to abort unrolling of loops.

Handling of Loops in the Class Initializer

It is beneficial to unroll loops in the class initializer itself. But if unrolling is not possible, partial evaluation may not be aborted like as for loops that are in invoked methods. When unrolling of a loop that is in the class initializer itself is not possible, the loop remains in the class initializer.

An approach is used that works in practice: start by unrolling each of the loops in the class initializer. If there is at least one non-unrollable loop partial evaluation is aborted and re-started without unrolling any loops. For the described embodiment, either each of the loops of the class initializer are unrolled, or none of the loops are unrolled. A class initializer that has any loop left will not be seen as "initialized at image build time", and the number of remaining loops may be immaterial.

Handling of Dependencies to Other Classes

Class initializer often have dependencies on other classes. In the simplest case, a static method of another class is invoked. In more complicated cases, static fields of other classes are loaded or stored. While storing a static field of another class always means that the class cannot be seen as "initialized at image build time", many class initializers with dependencies on other classes may still be successfully partially evaluated.

Three Cases May be Distinguished

Case 1, the used class was already partially evaluated (by a previously trigger) and that analysis already concluded successfully, i.e., the used class is already marked as "initialized at image build time". The class initialization check is simply removed. In addition, replacing loads of "static final" fields from that class with the image heap object that were produced by that prior partial evaluation may be possible.

Case 2, the used class was already analyzed and could not be partially evaluated. No optimization is possible, and the class initialization check remains. The class may also not be seen as "initialized at image build time".

Case 3, the used class was not analyzed yet. An analysis of the used class is to be triggered. But because many classes have circular dependencies, the used class may not be analyzed independently. Instead, the decision if the class initialisers are partially evaluatable is done for a cluster of classes that depend on each other. The following example illustrates dependencies:

```
class A {
  static { B.bar( ); }
  static foo( ) { }
}
class B {
  static { A.foo( ); }
  static bar( ) { }
}
```

The class initializer of class A has a dependency on class B because class A invokes the static method B.foo( ). The class initializer of class B has a dependency on class A, because class B invokes the static method A.foo( ). Class A may be "initialized at image build time" when B is also "initialized at image build time", and vice versa, but not when class B is not "initialized at image build time". An independent analysis of either class A or class B may not prove whether class A or class B may be evaluated. Analyzing class A and class B may be done as part of the same cluster, i.e., proving both of class A and class B at the same time, may yield the desired result that both A and B are "initialized at image build time".

When Partial Evaluation of a Class Initializer is Not Successful

Even when a class initializer cannot be partially evaluated completely, using the compiler intermediate representation after partial evaluation for that initializer may have benefits: when some allocations are replaced with constants, there is still less work to do at runtime when executing the partially evaluated class initializer. Whether or not to use the partially evaluated class initializer depends on the estimates machine code size of the class initializer: if the estimated machine code size of the partially evaluated class initializer plus the size of the image heap objects created by the partial evaluation is smaller than the estimates machine code size of the class initializer without partial evaluation, then using the partially evaluated class initializer reduces the overall application size.

However, the class may be treated as "not initialized at image build time", i.e., no class initialization checks for that class are removed. The overall benefits of such an improved class initializer may be less than when partial evaluation may fully eliminate the class initializer. Heuristics like on how to handle invoked methods and how to handle loops are therefore optimized to maximize the number of class initializers that may be fully eliminated.

Figures 5A, 5B:
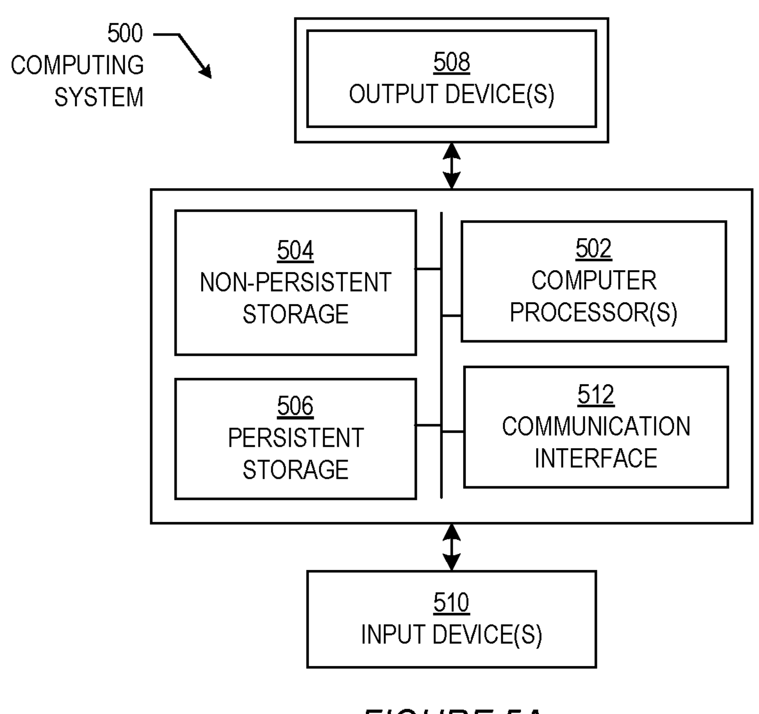
FIG. 5A and FIG. 5B show computing systems in accordance with disclosed embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores or micro-cores of a processor. The computer processor(s) (502) includes one or more processors. The one or more processors may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output device(s) (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output device(s) (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a computer program product that includes a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments of the invention.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The figures of the disclosure show diagrams of embodiments that are in accordance with the disclosure. The embodiments of the figures may be combined and may include or be included within the features and embodiments described in the other figures of the application. The features and elements of the figures are, individually and as a combination, improvements to the technology of compilers and build systems. The various elements, systems, components, and steps shown in the figures may be omitted, repeated, combined, and/or altered as shown from the figures. Accordingly, the scope of the present disclosure should not be considered limited to the specific arrangements shown in the figures.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:

building a native image from a build image compiled from source code;

executing, at image build time, a single execution method of the build image to update an image heap of the native image, wherein the single execution method is executed with a single execution for a native instance;

identifying, in the native image, the single execution method as partially evaluated at the image build time, wherein execution of the single execution method is halted to save a current state of an instantiation of the build image during image build time and the native instance resumes execution of the single execution method at runtime using the current state; and storing the image heap to the native image built from the build image.

2. The method of claim 1, further comprising: initializing, at runtime, a runtime heap from the image heap for the native image.

3. The method of claim 1, further comprising: wherein the single execution of the single execution method is performed during one or more of the image build time and runtime.

4. The method of claim 1, further comprising: executing the single execution method as part of a class, of a set of classes, wherein initialization of the class at the image build time is conditioned upon initialization of a different class at the image build time of the set of classes.

5. The method of claim 1, further comprising: executing the single execution method, wherein the single execution method is a class initializer of a class.

6. The method of claim 1, further comprising: executing, for the single execution, the single execution method once without a subsequent execution.

7. The method of claim 1, further comprising: identifying a class, comprising the single execution method, as partially initialized at image build time after the execution of the single execution method encounters an unresolvable dependency.

8. The method of claim 1, further comprising: identifying a class, comprising the single execution method, as initialized at image build time after allocating one or more objects to the image heap.

9. The method of claim 1, further comprising: executing a remaining portion of the single execution method at runtime using the image heap.

10. The method of claim 1, further comprising: unrolling a loop as part of executing the single execution method.

11. The method of claim 1, further comprising:

receiving the build image compiled from the source code, wherein the source code comprises a class definition; and processing the build image, comprising the single execution method, to generate the native image, comprising the image heap.

12. The method of claim 1, further comprising: executing the native image using the image heap, wherein the native image corresponds to an operating system and a hardware architecture.

13. A system comprising:

at least one processor;

at least one memory coupled to the processor; and an application executing on the processor and configured for:

building a native image from a build image compiled from source code;

executing, at image build time, a single execution method of the build image to update an image heap of the native image, wherein the single execution method is executed with a single execution for a native instance;

identifying, in the native image, the single execution method as partially evaluated at the image build time, wherein execution of the single execution method is halted to save a current state of an instantiation of the build image during image build time and the native instance resumes execution of the single execution method at runtime using the current state; and storing the image heap to the native image built from the build image.

14. The system of claim 13, wherein the application is further configured for: initializing, at runtime, a runtime heap from the image heap for the native image.

15. The system of claim 13, wherein the application is further configured for: wherein the single execution of the single execution method is performed during one or more of the image build time and runtime.

16. The system of claim 13, wherein the application is further configured for: executing the single execution method as part of a class, of a set of classes, wherein initialization of the class at the image build time is conditioned upon initialization of a different class at the image build time of the set of classes.

17. The system of claim 13, wherein the application is further configured for: executing the single execution method, wherein the single execution method is a class initializer of a class.

18. The system of claim 13, wherein the application is further configured for: executing, for the single execution, the single execution method once without a subsequent execution.

19. The system of claim 13, wherein the application is further configured for: identifying a class, comprising the single execution method, as partially initialized at image build time after the execution of the single execution method encounters an unresolvable dependency.

20. A method comprising:

receiving a native image, wherein the native image is generated by:

building the native image from a build image compiled from source code;

executing, at image build time, a single execution method of the build image to update an image heap of the native image, wherein the single execution method is executed with a single execution for a native instance;

identifying, in the native image, the single execution method as partially evaluated at the image build time, wherein execution of the single execution method is halted to save a current state of an instantiation of the build image during image build time and the native instance resumes execution of the single execution method at runtime using the current state; and storing the image heap to the native image built from the build image;

initializing, at runtime, a runtime heap from the image heap for the native image; and executing the native image as the native instance.

* * * * *